United States Patent [19]

Scott

[11] Patent Number: 5,563,625
[45] Date of Patent: Oct. 8, 1996

[54] FAST 180 DEGREE IMAGE ROTATION AND REVERSAL

[75] Inventor: Steven M. Scott, Boulder, Colo.

[73] Assignee: IBM Corporation, Armonk, N.Y.

[21] Appl. No.: 302,307

[22] Filed: Sep. 8, 1994

[51] Int. Cl.$^6$ ........................................ G09G 5/34
[52] U.S. Cl. ...................... 345/126; 382/293; 382/296
[58] Field of Search ............................ 345/126; 382/293, 382/296

[56] References Cited

U.S. PATENT DOCUMENTS 4,947,344  8/1990  Hayashi et al. .................... 364/518

OTHER PUBLICATIONS

IBM Technical Disclosure Bulletin Article Entitled "90° and 270° Degree Rotation of a $2^n$ Binary Image Using a $2^n$ Bit Processor" By C. Cox, vol. 30, No. 12, May 1988, pp. 26–28.

IBM Technical Disclosure Bulletin Article Entitled "Method for Rotating an 8×8 Bit Image" by G. Goertzel, vol. 27, No. 8, Jan. 1985, pp. 4593–4595.

Primary Examiner—Richard Hjerpe
Assistant Examiner—Vui T. Tran
Attorney, Agent, or Firm—Homer L. Kneal; Saul A. Seinberg

[57] ABSTRACT

A method of reversing all of the pixels in an image word uses recursive steps of shifting the image word a varying, predetermined number of spaces, followed by filtering the shifted and unshifted words through a varying, predetermined mask. The number of cycles necessary to reverse an image word having $2^n$ pixels is n cycles, plus one additional shifting step. This method of reversing a single image word is used to generate the mirror image of an input image. This image word reversal method is also useful for rotating an image word 180 degrees about an axis through its center.

6 Claims, 9 Drawing Sheets

FAST 180 DEGREE IMAGE ROTATION AND REVERSAL

BACKGROUND OF THE INVENTION

1. Field of the Invention

This invention relates to apparatus and methods for controlling the display of a digital image. The present invention is particularly useful for quickly and efficiently reversing and/or rotating images for a computer display or printer.

2. Description of the Related Art

Methods for processing digital imagery in computers tend to be slow because of the number of steps and the amount of memory involved. Any method which shaves even a small amount of time off of a step which is repeated many times will result in a performance improvement.

Previously, if a section of an image was to be reversed (the last pixel exchanged with the first pixel and so on through the section), a look up table was used. An example of this method is given in U.S. Pat. No. 4,947,344 by Hayashi et al. It is necessary to reverse many small sections of an image in order to rotate it 180 degrees about a central point, or to get its mirror image. Thus, an improvement in the time to reverse a section of an image results in better performance overall.

Attempts have been made to improve the performance of rotating an image 90 degrees. IBM TECHNICAL DISCLOSURE BULLETIN Vol. 27, no. 8, January 1985, pp 4593–4595 by G. Goertzel gives one example. Another example of rotating images 90 degrees and 270 degrees is given in IBM TECHNICAL DISCLOSURE BULLETIN Volume 30, number 12, May 1988, pp 26–28 by C. Cox.

A need remains in the art for a faster method of reversing a section of an image.

SUMMARY OF THE INVENTION

In accordance with the present invention, a method is provided for reversing all of the pixels in an image word by utilizing recursive steps of shifting the image word a varying, predetermined number of spaces, followed by filtering the shifted and unshifted words through a varying, predetermined mask. The number of cycles necessary to reverse an image word having $2^n$ pixels is n cycles, plus one additional shifting step. This method of reversing a single image word is used to generate the mirror image of an input image. This image word reversal method is also useful for rotating an image word 180 degrees about an axis through its center.

Effectively, this method of reversing all of the pixels in an image word divides the word into two sections, exchanges the two sections, divides each section into two smaller sections and exchanges those sections, and continues to divide and exchange until individual pixels have been exchanged. This method reverses a word of sixteen pixels or longer faster on a computer than simply exchanging the pixels one by one.

The method for reversing the image word in accordance with the present invention is useful for generating the vertical mirror image of an input image (so that the upper right corner becomes the upper left corner) by stepping through the scan lines of the image, and for each scan line, reversing the first and last image words of the line and exchanging them, then moving in and reversing and exchanging the second and second to last words, and so on, to the center of the line. The middle word of the line is reversed if there are an odd number of words in the line.

This method for reversing image words is also useful in rotating an image 180 degrees about an axis through the center point of the image (so that the upper right corner becomes the lower left corner). The first and last image words of the image are reversed and exchanged. Then the second and second-to-last words are reversed and exchanged, and so on, to the center of the image. If there are an odd number of image words in the image, the center image word is reversed.

Those having normal skill in the art will recognize the foregoing and other features and applications of the present invention from the following more detailed description of the preferred embodiments as illustrated in the accompanying drawings.

DETAILED DESCRIPTION OF THE PREFERRED EMBODIMENTS

Figure 1:
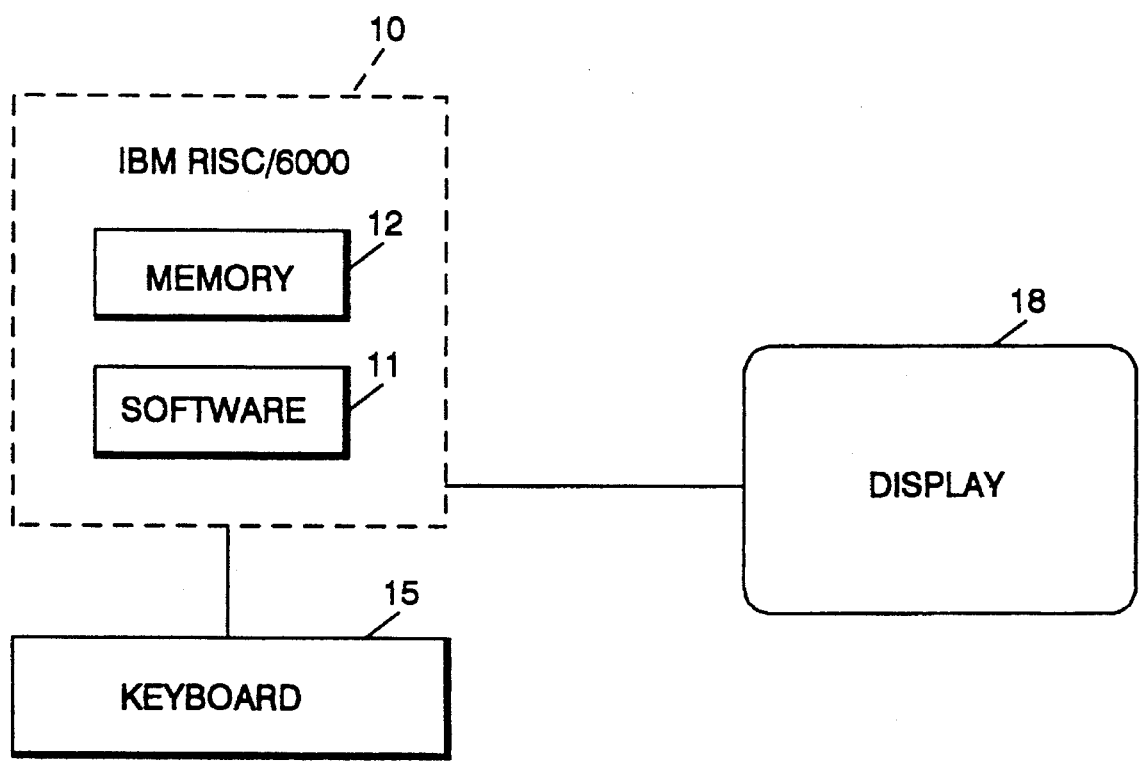
FIG. 1 is a block diagram showing the environment of the present invention.

FIG. 1 shows the preferred environment for the present invention. Software 11 for implementing the method of the present invention is resident in an IBM Risc System/6000 computer 10. Software 11 operates on images contained in memory 12, and displayed on display 18. A user controls operation of software 11 through keyboard 15.

Figure 2:
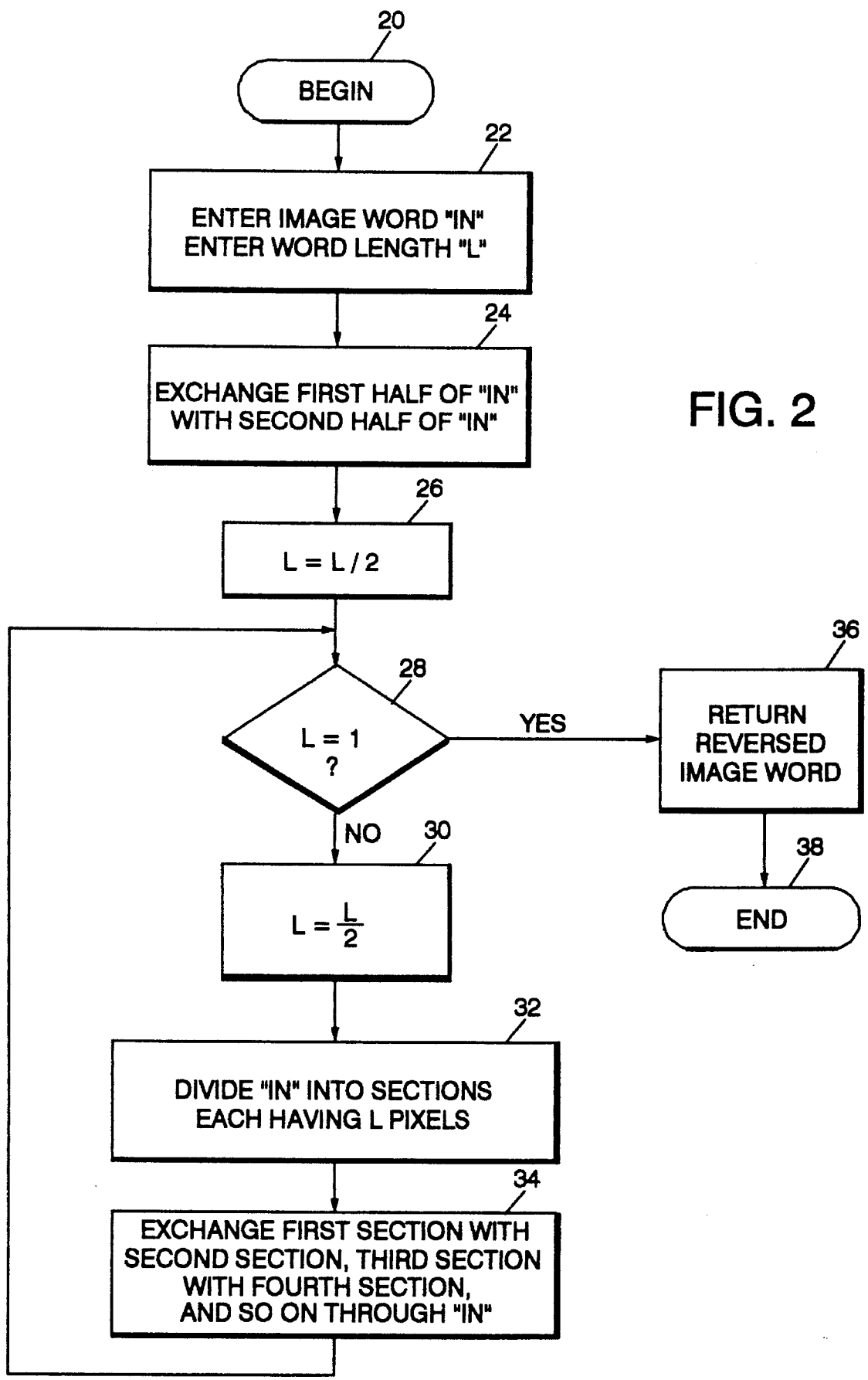
FIG. 2 is a flow diagram of a method of reversing a small segment of an image.
Figure 5A:
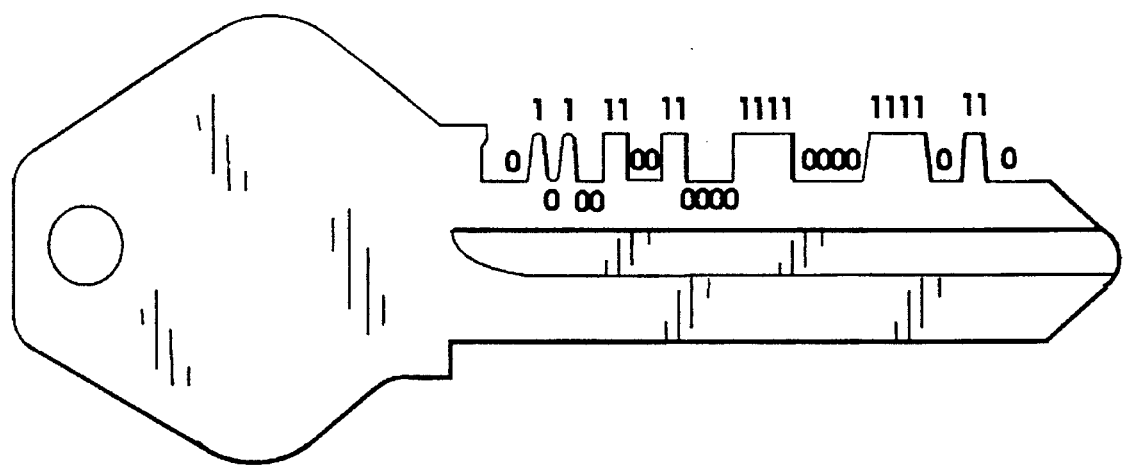
FIG. 5A and 5B show image segments before and after being reversed by the process of FIG. 2.
Figure 5B:
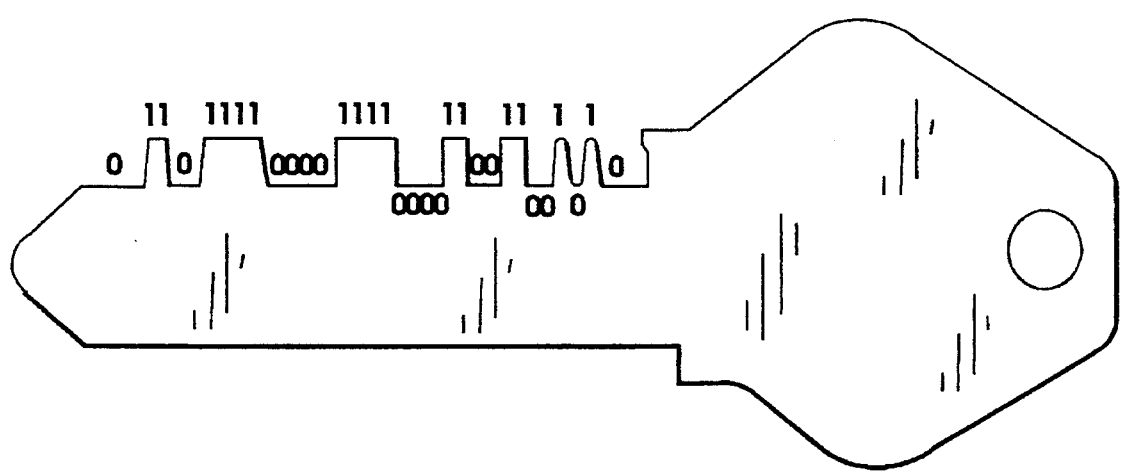

FIG. 2 shows a flow diagram illustrating a method of reversing a small segment of an image or an "image word" in accordance with the present invention. "Reversing" an image word means the left-most pixel of the image word is now found at the right end of the image word, and the right-most pixel of the image word is now found at the left end, and so on, through the image word. An example of reversing an image word is shown in FIG. 5.

The process of FIG. 2 begins at operation 20, and enters the image word "IN" to be reversed and the length of the image word "L" in operation 22. Operation 24 exchanges the first half of the image with the second half of the image. L is divided by two in operation 26. Operation 28 checks whether L equals 1. If not, operation 30 divides L by 2, and operation 32 divides the image word into sections such that each section has L pixels. Operation 34 exchanges the first section with the second section, and the third section with the fourth section, and so on through the image word. Next, operation 28 checks whether L has dropped to one yet. Each loop divides the image word into smaller and smaller sections, and swaps the sections until each pixel is swapped with its neighbor in the last iteration. At that point L equals one, and operation 36 returns the reversed image word. Operation 38 ends.

The process of FIG. 2 works for any word length that is a factor of two. For example, if IN had four pixels, say 1011, operation 24 would swap the first two pixels with the last two pixels, giving 1110. Operation 26 divides four by two, making L equal to two. Since L does not equal one in operation 28, L is divided by two in operation 30, making L equal to one. Operation 32 divides IN into sections, each having one pixel. Operation 34 exchanges the first pixel with the second pixel, and the third pixel with the fourth pixel, giving 1101. Since L is now equal to one, operation 36 returns the reversed image word 1101.

Figure 3:
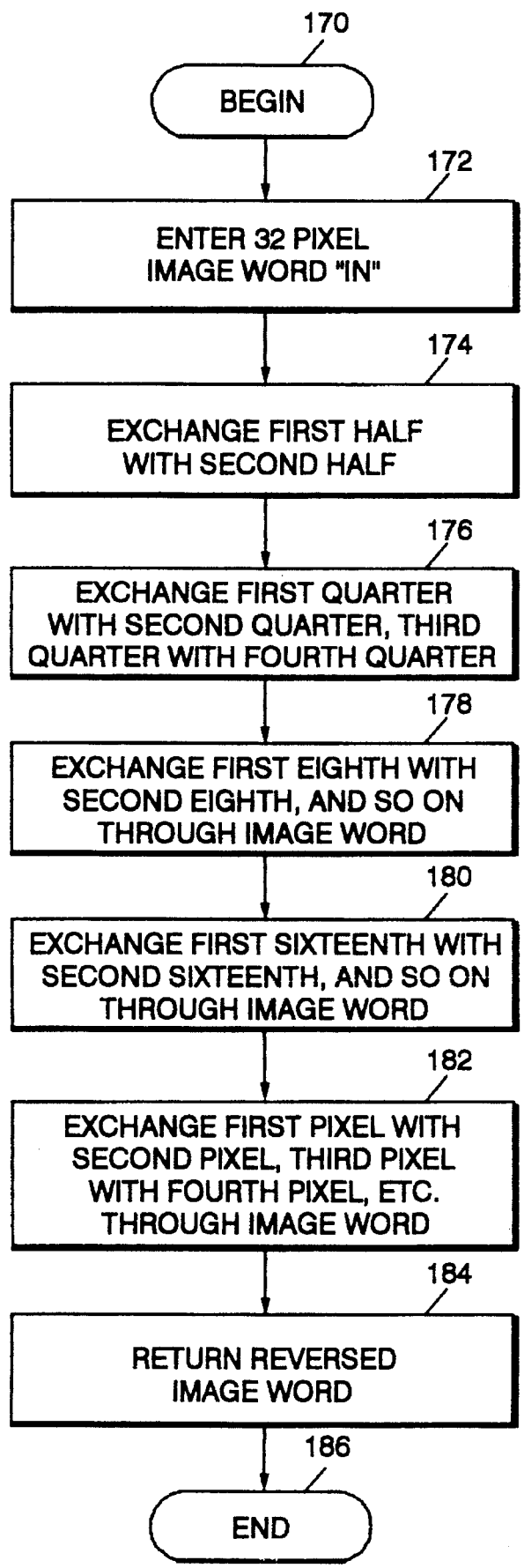
FIG. 3 is a flow diagram of the method of FIG. 2 applied to an image word having 32 pixels.

FIG. 3 shows the method of FIG. 2 adapted to operate on image words having 32 pixels. Thus, operation 170 begins and operation 172 enters the 32 pixel image word IN. Operation 174 exchanges the first sixteen pixels (the first half of the image word) with the second sixteen pixels (the second half of the image word). Operation 176 exchanges quarters, the first eight pixels with the second eight pixels and the third eight pixels with the fourth eight pixels. Operation 178 exchanges eighths, the first four pixels with the second four pixels, etc. Operation 180 exchanges sixteenths, the first two pixels with the second two pixels, etc. Operation 182 exchanges 32nds, the first pixel with the second pixel, and so on through the image word. Operation 184 returns the reversed image word, and 186 ends.

Figure 4A:
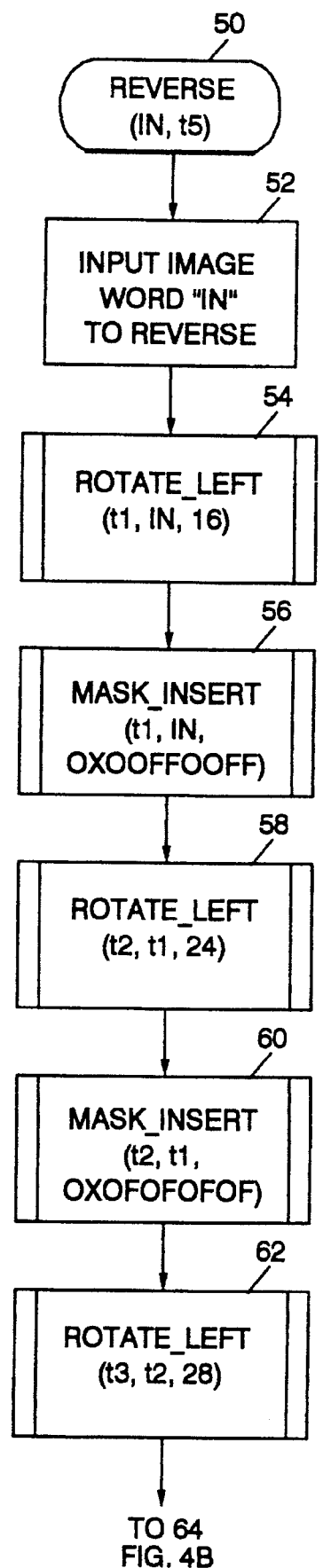
FIGS. 4A and 4B comprise a more detailed block diagram of the method of FIG. 3
Figure 4B:
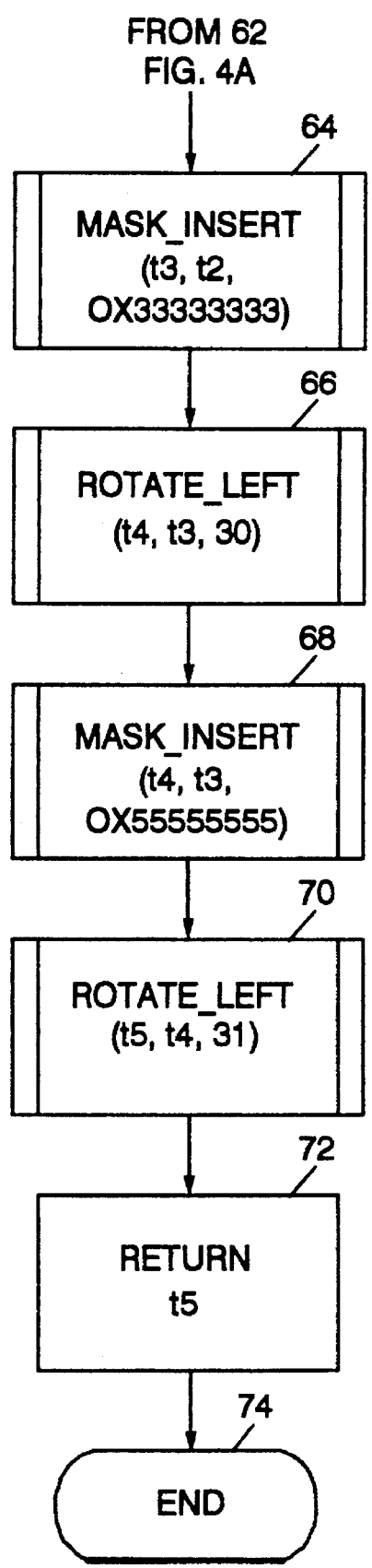
Figure 6:
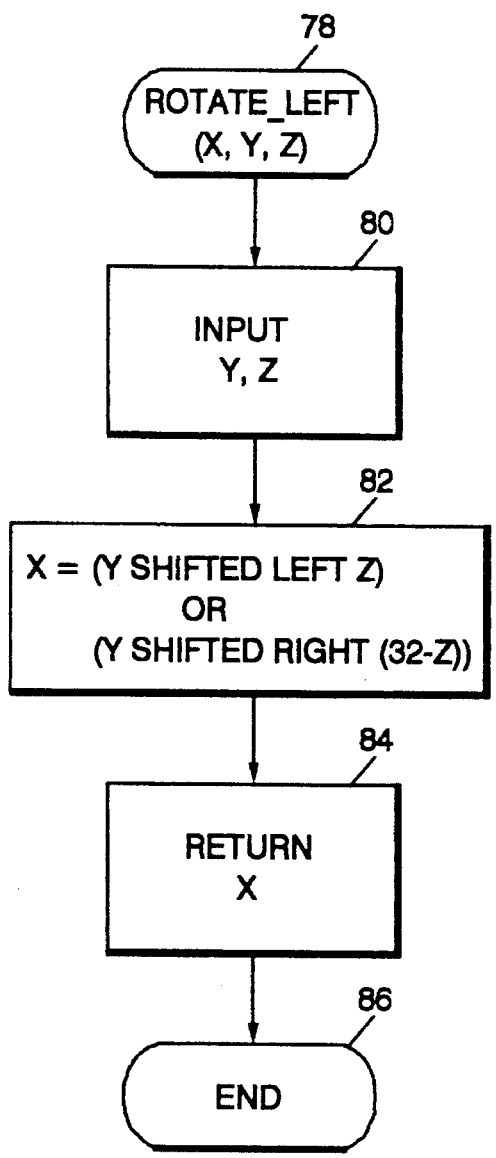
FIG. 6 is a flow diagram of a subroutine for rotating an image segment to the left, which is used in the method of FIG. 2.

FIG. 4 shows the process of FIG. 3 in more detail. The REVERSE process 50 begins with operation 52 which inputs the 32 pixel image word "IN" to be reversed. In operation 54, the ROTATE_LEFT subroutine is called. ROTATE_LEFT is shown in FIG. 6, and results in the image word "IN" being rotated 16 pixels to the left, and placed in register t1. The 16 pixels which are pushed off of the left edge of the word wrap around and fill the 16 right most pixels of t1. Operation 54 results in the first 16 pixels and the last 16 pixels of the word being exchanged.

Figure 7:
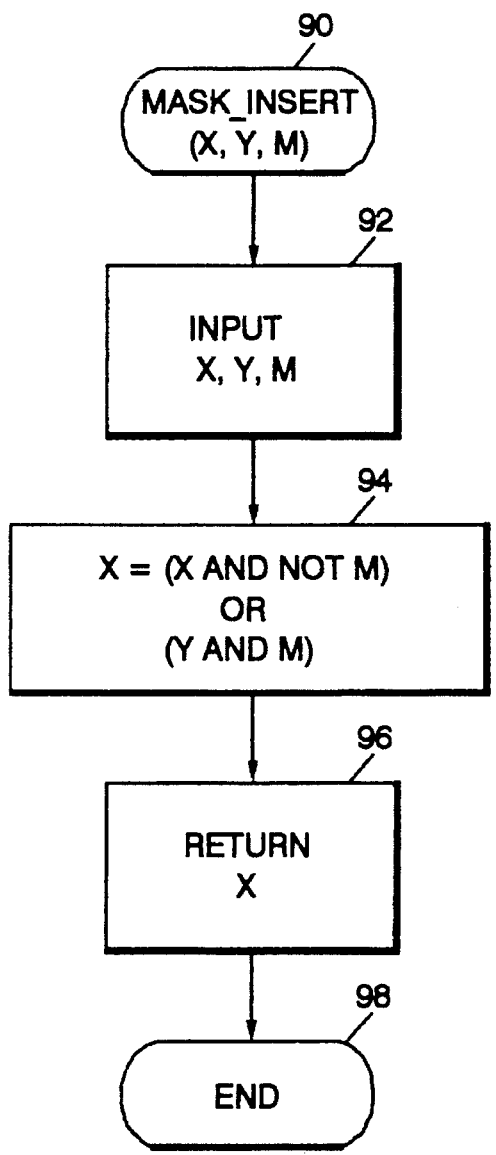
FIG. 7 is a flow diagram of a subroutine for filtering two inputs through a mask which is used in the method of FIG. 2.

Operation 56 calls subroutine MASK_INSERT. The MASK_INSERT subroutine is shown in FIG. 7, and results in t1 being replaced by the pixels of t1 wherever the mask has zeroes, and t1 being replaced by the pixels of IN wherever the mask has ones. The mask used in operation 56 has eight zeroes, followed by eight ones, followed by eight more zeroes, then eight more ones. Since t1 was rotated 16 pixels in operation 54, the zeroes in the mask select rotated portions of the image word for the first through eighth pixels and the 17th through 24th pixels. This places the original first through eight pixels in the 17th through 24th slots and the original 17th through 24th pixels in the first through eighth slots.

The ones in the mask select the original, unrotated pixels of the ninth through 16th slots and the 25th through 32nd slots, and leave them in place. Thus, the final effect of operation 56 is to swap the first through eighth pixels with the 17th through 24th pixels, and leave the rest of the pixels as they were in the original word.

Using Boolean mathematics, operation 56 implements the following function:

t1=(t1 AND NOT 00FF00FF) OR (IN AND 00FF00FF)

00FF00FF is a hexadecimal representation of the mask used in operation 56 to filter the two inputs, IN and t1. In binary, the mask is 00000000111111110000000011111111.

Operation 58 rotates t1 left 24 pixels, and places the result in t2. This means the pixels in slots 1–8 after operation 56 (which were originally in slots 17–24) are now in slots 9–16. The pixels in slots 9–16 are now in slots 17–24. The pixels in slots 17–24 after operation 56 (originally in slots 1–8) are now in slots 25–32. The pixels in slots 25–32 are now in slots 1–8.

Operation 56 and operation 58 combined result in the first eight pixels and the second eight pixels of register t1 after operation 54 being exchanged, and the third eight pixels and the fourth eight pixels being exchanged and the result being placed in register t2.

Operation 60 filters registers t1 and t2 through the mask 0F0F0F0F (00001111000011110000111100001111 in binary). The zeroes in the mask select the pixels of register t2, and the ones select the pixels of register t1. Operation 62 rotates the image word 28 pixels to the left. The combination of operations 60 and 62 exchanges the first four pixels of t2 with the second four pixels, the third four pixels with the fourth four pixels, and so on through register t2, placing the result in register t3.

Operation 64 filters t2 and t3 through the mask 33333333 (00110011001100110011001100110011 in binary). Operation 66 rotates t3 left 30 pixels, and places the result in t4. Thus, the first two pixels of t3 are exchanged with the second two pixels, the third two pixels are exchanged with the fourth two pixels, and so on through the register t3, and the result is placed in register t4.

Operation 68 filters registers t3 and t4 through the mask 55555555 (01010101010101010101010101010101 in binary). Operation 70 then rotates t4 left 31 pixels, and places the result in t5. Operations 68 and 70 exchange the first pixel of t4 with the second pixel, the third pixel with the fourth pixel, and so on through the register t4, and place the result in register t5. t5 now contains the reverse of "IN", and operation 72 returns this result and the process ends at 74.

To illustrate the operation of REVERSE, an example is given below of the process with sample input word IN:

IN=0101 0011 0011 0000 1111 0000 1111 0110.

Operation 54 rotates IN to the left 16 pixels, and places it in register t1. Thus, the first 16 pixels and the second 16 pixels are exchanged:

t1=1111 0000 1111 0110 0101 0011 0011 0000  (54)

Operation 56 filters IN and t1 through the mask 00FF00FF.

t1=1111 0000 0011 0000 0101 0011 1111 0110  (56)

Operation 58 rotates t1 left 24 pixels, and places it in register t2:

t2=1111 0110 1111 0000 0011 0000 0101 0011  (58)

Operations 56 and 58 exchanged the first eight pixels of t1 with the second eight pixels, etc., and stored the result in register t2. Operation 60 filters registers t1 and t2 through mask 0F0F0F0F and stores the result in t2:

t2=1111 0000 1111 0000 0011 0011 0101 0110  (60)

Operation 62 shifts register t2 left 28 pixels and stores the result in register t3:

t3=0110 1111 0000 1111 0000 0011 0011 0101    (62)

Operations 60 and 62 exchanged the first four pixels of t2 with the second four pixels, etc., and stored the result in t3. Operation 64 filters registers t2 and t3 through mask 33333333, and stores the result in t3:

t3=0111 1100 0011 1100 0011 0011 0001 0110    (64)

Operation 66 shifts t3 left 30 pixels, and stores the result in register t4:

t4=1001 1111 0000 1111 0000 1100 1100 0101    (66)

Operations 64 and 66 exchanged the first two pixels of t3 with the second two pixels, etc., and stored the result in t4. Operation 68 filters t3 and t4 through mask 55555555, and stores the result in t4:

t4=1101 1110 0001 1110 0001 1001 1001 0100    (68)

Operation 70 shifts t4 left by 31 pixels, and stores the result in register t5.

t5=0110 1111 0000 1111 0000 1100 1100 1010    (70)

Operations 68 and 70 exchanged the first pixel of t4 with the second pixel, etc., and stored the result in t5. The result stored in register t5 is the reverse of the input word IN given above.

The method shown in FIG. 2 is specifically designed to operate on 32 pixel image words. Those skilled in the art will appreciate that it would be trivial to modify the method of FIG. 2 to operate on any image word length (so long as the length is a factor of two). For example, to reverse a 16 pixel image word, replace operation 54 with:

ROTATE_LEFT (t1, IN, 8), delete steps 56 and 58, and, in steps 60–72, replace t1 with IN, t2 with t1, t3 with t2, t4 with t3, and t5 with t4.

To reverse a 64 pixel image word, replace operation 54 with:

ROTATE_LEFT (t1, IN, 32), add the following steps as operations 55 and 55A:

MASK_INSERT (t1, IN, 0000FFFF)    (55)

ROTATE_LEFT (t2, t1, 16)    (55A)

and in steps 56–72, replace IN with t1, t1 with t2, t2 with t3, t3 with t4, t4 with t5, and t5 with t6.

Figure 8:
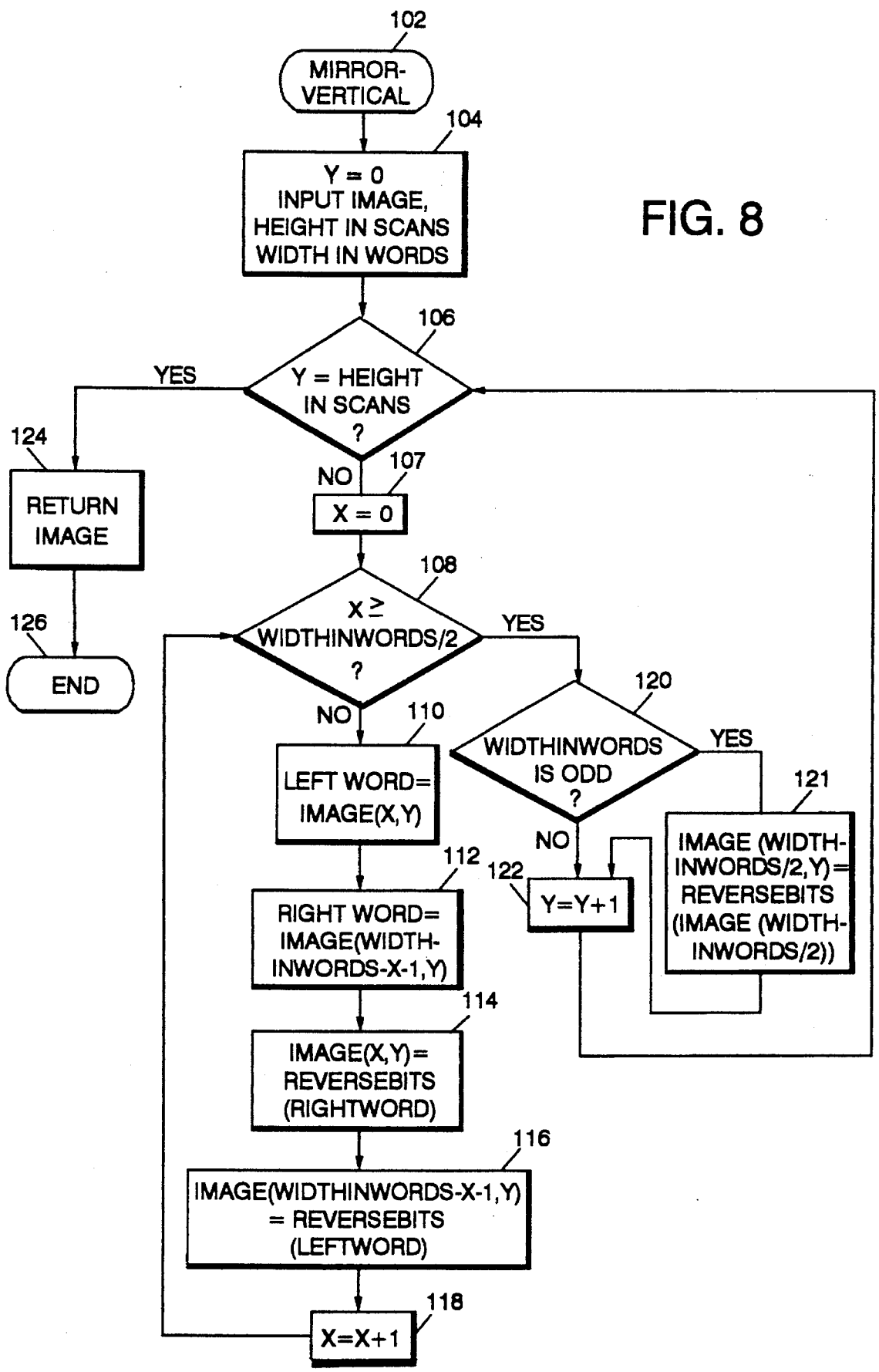
FIG. 8 is a flow diagram of a method for obtaining a vertical mirror image of an input image which utilizes the method of FIG. 2.

FIG. 5 shows an image of a key which includes the example image word IN before and after the image is reversed. FIG. 8 shows how an entire image is reversed.

FIG. 6 shows the ROTATE_LEFT subroutine 78 used by REVERSE. ROTATE_LEFT uses three variables, x, y, and z. y is the word to be rotated, z is the amount of pixels y is to be rotated left, and x is the rotated word returned by the subroutine. ROTATE_LEFT is provided because many programming languages do not have a built in command to wrap the overflow pixels around and put them back into the empty right most pixels.

Operation 80 inputs y, the word to be rotated left, and z, the number of pixels to rotate y. Operation 82 performs the rotation function by ORing y shifted left by z pixels with y shifted right by (32-z) pixels, and storing the result in x. Operation 84 returns x. The subroutine ends at 86.

FIG. 7 shows the MASK_INSERT subroutine 90 used by REVERSE. MASK_INSERT uses three variables, x, y, and m. x and y are registers containing data. Register m contains a mask for filtering x and y. The result of the filtering operation is stored back in x.

Operation 92 inputs x, y, and m. Operation 94 implements the function:

x=(x AND NOT m) OR (y AND m)

As discussed above, operation 92 causes the zeroes in the mask m to select the associated pixels in image word x, while the ones in mask m select the associated pixels in image word y.

Operation 96 returns x, and operation 98 ends.

The function implemented by operation 94 is a built-in assembler instruction of the IBM Risc System/6000 computer with POWER processor. The instruction is called maskir and is implemented as:

maskir (x,y,m)=(x AND NOT m) OR (y AND m).

Therefore, in the case where the preferred method is operated on a Risc System/6000, the most efficient way to implement MASK_INSERT is to use maskir. On other systems, MASK_INSERT is simple to program. A maskir macro could be written, for example.

FIG. 8 shows how REVERSE may be used in the process of reversing an entire image, which is the equivalent of creating a mirror image of the input image. Subroutine MIRRORVERTICAL 102 creates a vertical mirror image of the image provided to it.

Operation 104 sets index y to zero, and inputs the image IMAGE, along with the height of the image in pixels, or scans, HEIGHTINSCANS and the width of the image in words, WIDTHINWORDS. It is assumed for simplicity in FIG. 5 that the image has been stored in a zero-based two dimensional array, IMAGE(x,y). Also, a word is assumed to be 32 pixels (or bits) long.

Operation 106 is the beginning of an outer loop which steps through the scans or horizontal lines. Thus, operation 106 checks whether y has reached HEIGHTINSCANS yet. Operation 107 sets index x to zero. Operation 108 is the beginning of a loop which steps through the words in a scan line two at a time (one from each end). Thus, operation 108 checks whether x has reached or exceeded WIDTHINWORDS/2. Operation 110 stores the xth image word of the line y in variable LEFTWORD. Operation 112 stores the xth image word from the right into RIGHTWORD. Operation 114 reverses RIGHTWORD using REVERSE and stores the result into the xth image word of the line. Operation 116 reverses LEFTWORD using REVERSE, and stores the result into the xth image word from the right. Thus, the xth image word from the left and the xth image word from the right have been reversed by REVERSE and swapped in IMAGE. Operation 118 indexes x to move in toward the center of line y until x equals or exceeds WIDTHINWORDS/2.

Decision 120 determines whether WIDTHINWORDS is odd. If so, operation 121 reverses the center image word of line y using REVERSE. Either way, operation 122 indexes y to move to the next line. Once y reaches HEIGHTINSCANS, the mirror image reversed IMAGE is returned in operation 124. Operation 126 ends.

Figure 9:
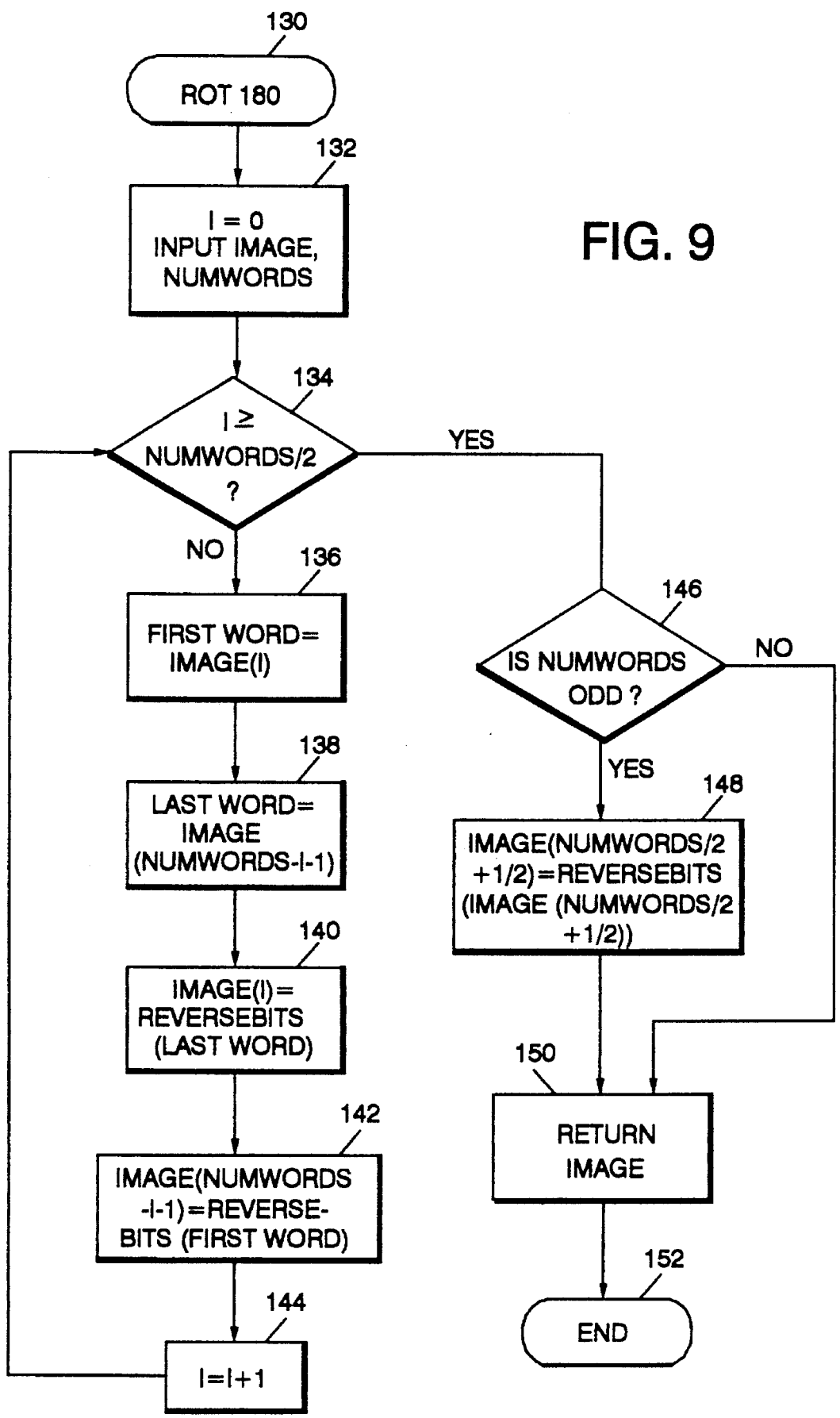
FIG. 9 is a flow diagram of a method for obtaining a 180 degree rotation of an input image which utilizes the method of FIG. 2.

FIG. 9 shows how REVERSE may be used in creating a 180 degree rotation of an image. The ROT180 subroutine 130 rotates an input image about a central point 180 degrees. Here, it is not necessary to have the image stored in a two dimensional array because the subroutine does not have to keep track of which scan line it is on. The subroutine only needs to know the number of words and their addresses. The subroutine steps through the image two words at a time, starting with the first image word and the last image word. If the total number of words in the image (as opposed to the number of words in each line) is odd, then the center image word must be reversed by REVERSE separately.

Operation 132 sets index i to zero, and inputs the image IMAGE and the number of words in the image NUMWORDS. Operation 134 is the beginning of a loop that steps through the words of IMAGE, two at a time (starting at the first image word and the last image word). Thus, operation 134 checks whether index i has reached or exceeded NUMWORDS/2. If it hasn't, then the ith image word of the image is placed in variable FIRSTWORD by operation 136. The ith image word from the end is placed in LASTWORD by operation 138. The image word stored in LASTWORD is then reversed using REVERSE, and placed into the ith image word of IMAGE. The image word stored in FIRSTWORD is reversed and placed into the ith image word from the end of IMAGE. Thus, the upper left hand corner becomes the lower right hand corner, and so on. Operation 144 indexes i. Once i has reached or exceeded NUMWORDS/2, operation 146 checks whether NUMWORDS is odd. If it is, operation 148 reverses the center image word. Operation 150 returns the rotated image, and operation 152 ends.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A method for reversing all of the pixels in an image word comprising the computer implemented steps of:
   a. dividing the image word into two sections;
   b. exchanging the first section of the image word with the second section;
   c. dividing each section into two smaller sections and exchanging the two smaller sections; and
   d. repeating step (c) until individual pixels have been exchanged.

2. A mirror image method which utilizes the method of claim 1 for generating the mirror image of an input image, said input image composed of a vertical array of horizontal scan lines, each scan line having a plurality of image words, said mirror image method comprising the computer implemented steps of:
   for each scan line of the input image:
      stepping through each image word in the scan line from the left and the right simultaneously; and
      for each two words, one from the left side and one from the right side:
         reversing the pixels of each image word using the method of claim 1,
         placing the reversed pixels taken from the left side image word into the right side image word, and placing the reversed pixels from the right side image word into the left side image word,
      if the number of words in the scan line is odd, reversing the pixels of the center image word of the scan line by the method of claim 1.

3. An image rotation method which utilizes the method of claim 1 for rotating an input image by 180 degrees about a central point of the image, said input image composed of a two-dimensional array of image words, the upper left hand corner of said array being the beginning of the input image, and the lower right corner of said array being the end of the input image, said image rotation method comprising the computer implemented steps of:
   stepping through each image word in the input image from the beginning and the end simultaneously and for each two words, one from the beginning side and one from the end side:
      reversing the pixels of each image word using the method of claim 1,
      placing the reversed pixels taken from the beginning side image word into the end side image word and placing the reversed pixels from the end side image word into the beginning side image word,
   if the number of words in the input image is odd, reversing the pixels of the center image word of the image by the method of claim 1.

4. The method of claim 1 wherein said dividing and exchanging step of step (c) is accomplished by shifting the image word a varying, predetermined number of spaces and filtering the shifted and unshifted image words through a varying, predetermined mask.

5. A mirror image method which utilizes the method of claim 4 for generating the mirror image of an input image, said input image composed of a vertical array of horizontal scan lines, each scan line having a plurality of image words, said mirror image method comprising the computer implemented steps of:
   for each scan line of the input image:
      stepping through each image word in the scan line from the left and the right simultaneously; and
      for each two words, one from the left side and one from the right side:
         reversing the pixels of each image word using the method of claim 4,
         placing the reversed pixels taken from the left side image word into the right side image word and placing the reversed pixels from the right side image word into the left side image word,
      if the number of words in the scan line is odd, reversing the pixels of the center image word of the scan line by the method of claim 4.

6. An image rotation method which utilizes the method of claim 4 for rotating an input image by 180 degrees about a central point of the image, said input image composed of a two dimensional array of image words, the upper left hand corner of said array being the beginning of the input image and the lower right corner of said array being the end of the input image, said image rotation method comprising the computer implemented steps of:
   stepping through each image word in the input image from the beginning and the end simultaneously and for each two words, one from the beginning side and one from the end side:
      reversing the pixels of each image word using the method of claim 4,
      placing the reversed pixels taken from the beginning side image word into the end side image word and place the reversed pixels from the end side image word into the beginning side image word,
   if the number of words in the input image is odd, reversing the pixels of the center image word of the image by the method of claim 4.

* * * * *